No. 698,715. Patented Apr. 29, 1902.
J. KNIGHT.
LOCO EXTERMINATOR.
(Application filed July 25, 1901.)
(No Model.)
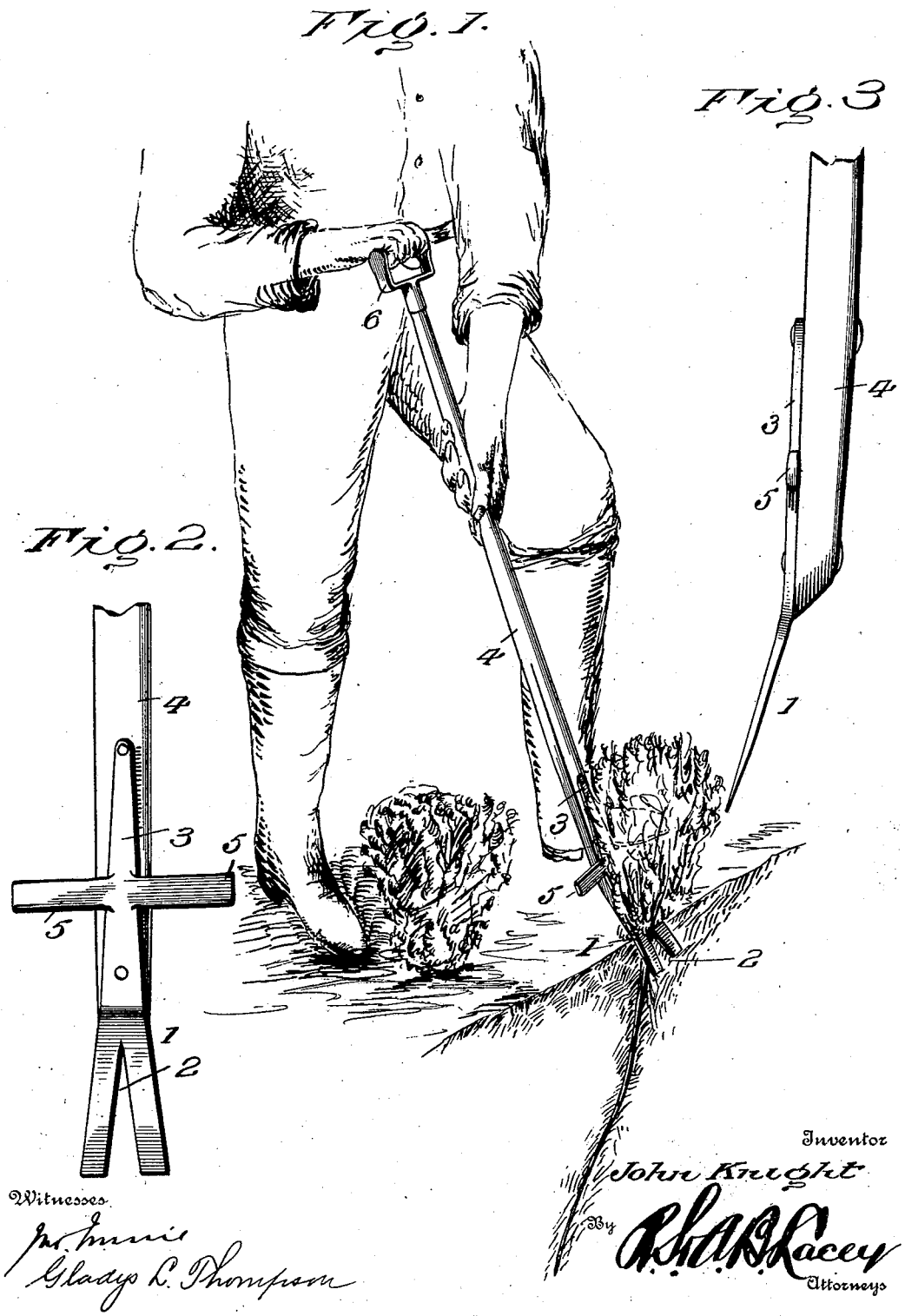
Inventor
John Knight

UNITED STATES PATENT OFFICE.

JOHN KNIGHT, OF CANYON, TEXAS.

LOCO-EXTERMINATOR.

SPECIFICATION forming part of Letters Patent No. 698,715, dated April 29, 1902.

Application filed July 25, 1901. Serial No. 69,697. (No model.)

*To all whom it may concern:*

Be it known that I, JOHN KNIGHT, a citizen of the United States, residing at Canyon, in the county of Randall and State of Texas, have invented certain new and useful Improvements in Loco-Exterminators; and I do hereby declare the following to be a full, clear, and exact description of the invention, such as will enable others skilled in the art to which it appertains to make and use the same.

Loco and kindred rank growths are difficult to eradicate, because the root penetrates the ground to a great depth and when pulling up the plant a small portion only of the root is removed, the part remaining throwing up shoots either stronger or more numerous than the plant removed. This invention provides an implement which will enable the plant, root and all, or a sufficiently large portion of the root for preventing future growths, to be removed, no matter to what depth the root may have penetrated, thereby completely extirpating the weed.

The implement consists, essentially, of a bit or blade attached to a long handle and having a lateral extension forming a rest for the foot to obtain a purchase upon when it is required to force the bit or blade into the ground, said bit or blade being cleft from the penetrating edge upward, so as to extend upon each side of the root below the stool, the root and plant being extracted by using the tool as a pry, the said lateral extension or foot-rest serving as a fulcrum.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view showing the application of the invention. Fig. 2 is a front view of the implement, the upper end of the handle being broken away. Fig. 3 is a side elevation.

Corresponding and like parts are referred to in the following description and indicated in the views of the drawings by the same reference characters.

The implement comprises a bit or blade and an operating-handle, and these parts may be integrally or separately formed and combined in any desired way. It is preferred to form the bit separate from the handle, thereby admitting of the latter being constructed of wood and the bit manufactured of steel or other metal.

The bit or blade 1 may be of any desired length and width and is preferably long and narrow and tapering in thickness. A cleft 2 is formed in the bit or blade and extends inward from the penetrating edge, which latter is sharpened to a chisel edge, so as to readily penetrate the soil when in active operation. The cleft 2 tapers toward its inner end and is adapted to receive the root of the weed or other plant to be extirpated. The bit or blade is formed with a shank 3, by means of which it is attached to the operating-handle 4, and this shank has a lateral extension 5 to form a foot-rest, upon which pressure is applied by means of the foot when it is required to force the bit or blade into the ground. This lateral extension 5 consists of a crossbar and projects from each side of the shank and handle to enable the blade to be forced into the ground by either foot. The bit or blade 1 inclines slightly from the shank or operating-handle, so as to facilitate the use of the implement as a pry when extracting the weed or other plant to be eradicated. The operating-handle 4 is provided at its upper end with a grip 6 for the hand. The bit or blade is secured to the handle through the instrumentality of the shank 3 and rivets or bolts, the latter passing through corresponding openings in the handle and shank.

The size of the bit or blade and the operating-handle will depend upon the particular use of the implement, and when strong plants are to be extracted and extirpated these parts must be sufficiently stout to withstand the strain, and the handle must be of a length to provide ample leverage for the easy manipulation of the tool when used as a pry for removing the plants. When the weed or plant is of the species known as "loco," the bit or blade is sunk into the ground at one side of the plant a short distance from the root, so that when bearing down upon the upper end of the handle 4 the root of the loco will enter the cleft 2 and the spaced portions of the bit or blade will come beneath the stool upon each side of the root, thereby loosening and withdrawing the root as the outer end of the handle is borne toward the ground. The stool of the plant acts as a head and enables the bit or blade to obtain a firm grip upon the root, which is gradually and forcibly extracted as the implement is used to pry the same from the ground.

This tool is also exceedingly practical and useful in thinning corn or similar plants, as well as for stripping suckers from corn.

Having thus described the invention, what is claimed as new is—

An implement for extirpating loco and extracting plants by the root, the same consisting of a straight flat blade having a cleft at its lower end, and having the cleft portions sharpened to an edge, a flat shank extended from the blade at an inclination and fastened to a side of the handle, and transversely-alined extensions projected laterally from the shank at a point between its ends to form foot-rests and a fulcrum for the implement to turn upon, said rests, blade and shank being integrally formed, substantially as set forth.

In testimony whereof I affix my signature in presence of two witnesses.

JOHN KNIGHT. [L. S.]

Witnesses:
W. C. BAIRD,
J. I. CAMPBELL.